United States Patent [19]
Uhrich

[11] 3,770,145
[45] Nov. 6, 1973

[54] PLOW APPARATUS FOR VESSEL UNLOADER
[75] Inventor: Morris B. Uhrich, Lansdale, Pa.
[73] Assignee: FMC Corporation, San Jose, Calif.
[22] Filed: Dec. 27, 1971
[21] Appl. No.: 211,884

[52] U.S. Cl. .................................. 214/14, 214/152
[51] Int. Cl. .......................................... B63b 27/00
[58] Field of Search .................. 214/14, 44 A, 152; 198/222

[56] References Cited
UNITED STATES PATENTS
| 3,497,054 | 2/1970 | Van Kleunen | 214/14 X |
| 732,571 | 6/1903 | Leonard | 214/14 X |
| 2,425,342 | 8/1947 | Palmer | 214/14 X |
| 2,322,504 | 6/1943 | Brandon | 214/14 |
| 1,138,627 | 5/1915 | Considine | 214/44 A |

FOREIGN PATENTS OR APPLICATIONS
6,617,856   6/1967   Netherlands ......................... 214/14

Primary Examiner—Gerald M. Forlenza
Assistant Examiner—Frank E. Werner
Attorney—F. W. Anderson et al.

[57] ABSTRACT

Plow apparatus is used with a high capacity unloading machine for removing bulk material from a barge or ship to move material into the path of the unloading machine for more complete removal of the material. The plow apparatus comprises one or more rotatable plow blades which are hoistable and movable laterally of the vessel so as to move the material on the sides of the vessel toward the center of the vessel.

21 Claims, 21 Drawing Figures

FIG_4

FIG_5

FIG_7

FIG_8

PLOW APPARATUS FOR VESSEL UNLOADER

BACKGROUND OF THE INVENTION

1. Field of the Invention

This invention relates to bulk material unloading or reclaiming machines and more particularly to means for unloading bulk material from barges, lighters, ships and movable storage containers. Plow apparatus is used in conjunction with an unloading machine to move material from portions of the vessel into the path of the unloading machine to more completely unload the vessel without auxiliary cleanup equipment and avoid the need for lateral movement of the unloading machine itself to accomplish complete removal of the material.

2. Description of the Prior Art

Barges, lighters or ships are often used for hauling a variety of bulk materials and several methods are commonly used for unloading such vessels. One of the popular unloading means where high capacity unloading is desired is a ladder type endless bucket elevator. Another type of unloader utilizes a rotating bucket wheel reclaimer. Where the vessels are known to be of fixed width, the unloader may be of the same width as the inside of the vessel so that the unloader can remove the material by one or more longitudinal digging passes along the length of the vessel. This means generally provides the most efficient or highest average rate of unloading.

However, where varying width vessels are to be unloaded, or where the width of the vessel is greater than the width of the unloader, some means must be provided to reclaim the material not reached by the unloading machine. One means often employed in such circumstances is to shuttle the unloading means laterally across the transverse width of the vessel during one or more of the longitudinal digging passes. This additional motion increases the complexity, size and cost of the unloader and, generally, unloading capacity is reduced during passes when the unloader is also moving laterally.

Another means of unloading a vessel wider than the unloader itself is to make one or more passes with the unloader in one position relative to the centerline of the vessel and then shift either the vessel or the unloader laterally for subsequent passes so the remaining material can be reclaimed. Such a solution requires additional machinery and increased cost and generally requires additional passes along the length of the vessel. This increases the total time of unloading the vessel. It is possible that this latter method would result in off-center unloading and create a list in the vessel. Depending on the degree of list, this method might be detrimental to the stability of the vessel or, at least, reduce the ability of the unloader to effectively remove all the material from the vessel.

Portable rubber tired front end bucket loaders and bulldozers have been used to move the material into the path of the unloader. Also, hydraulically operated scraper blades, resembling a back hoe, have been used for cleaning out material beneath the overhang on vessels having hatches. Such scraper devices are shown in U.S. Pat. Nos. 3,497,054 to J. P. Van Kleunen and 3,552,585 to Imre Adler. The use of non-rotatable but vertically and laterally adjustable triangular deflector plates for moving bulk material toward a central unloading conveyor is disclosed in U.S. Pat. No. 3,414,144 to J. H. A. Lassing.

Bucket elevator type of barge unloaders are disclosed in U.S. Pat. Nos. 3,337,025 to H. E. Dykeman, 3,387,721 to C. Ludwig and 3,583,582 to W. A. Ostarello. A rotary bucket wheel reclaimer combined with a bucket elevator for barge unloading is disclosed in U.S. Pat. Nos. 3,432,024 and 3,432,043 both to C. Ludwig. Other reclaimer-unloaders are shown in U.S. Pat. Nos. 3,307,717 to C. Ludwig, 3,356,232 to Price et al., 3,362,546 to D. B. Sale and 3,104,766 to J. Sasadi.

SUMMARY OF THE INVENTION

This invention relates to the utilization of plowing apparatus in combination with a bucket elevator type of vessel unloading machine. During one or more of the digging passes, or the return passes, as the vessel is moved longitudinally under the unloader, the plow apparatus will move the bulk material in the vessel which is not in the path of the unloading machine to a position where the material can be reached and, therefore, reclaimed by the unloading machine. Furthermore, this plow apparatus may also be utilized as false vessel sides during the digging pass to contain the material in the path of the unloading machine in the event that windrowing takes place, i.e., the material is pushed laterally beyond the reach of the unloader by the force of the digging action. By the use of this invention, the unloading machine does not have to be provided with means for lateral movement of the unloader with respect to the vessel, nor is it necessary to provide means for moving the vessel laterally during unloading.

The plow apparatus comprises a pair of plow blades individually rotatable about vertical axes and suspended on individual carriages which are movable laterally of the vessel. These plow supporting carriages are mounted in an elevator frame which is movable vertically to adjust the height of the plow blades to suit the water level and draft of the vessel. The elevator frame may also be capable of horizontal travel longitudinally of the length of the vessel. The elevator frame is suitably supported from a fixed supporting structure located adjacent to, but upstream of, the unloading machine.

In an alternate embodiment, the plow apparatus is supplemented by a skirt plate assembly comprising a pair of movable skirt plates positioned between the unloading machine and the plow apparatus. The skirt plates are suspended from a hoist carriage which provides for adjusting the vertical height of the skirt plates. The hoist carriage is also capable of horizontal travel longitudinally of the length of the vessel, and the plow mechanism may or may not have provision for longitudinal travel. The skirt plate is flexibly linked to the unloading machine so that as the loading machine is raised on its inclined track the skirt assembly maintains the same relative longitudinal spacing with the bottom of the unloader by the skirts' supporting carriage moving longitudinally and simultaneously hoisting the skirt assembly as the unloader is raised.

In a second alternate embodiment, the plow apparatus comprises a single plow blade suspended from a laterally movable carriage with a hinged linkage to accommodate a list or tilting of the vessel with respect to the movable carriage. The plow blade is rotatable about a vertical axis and is mounted in an elevator frame which is movable vertically to adjust the height of the plow blade. The plow blade is normally rotated at an angle to the sides of the vessel to plow the material into the path of the unloader during reclaiming. When the unloader is positioned adjacent to one longitudinal side of the vessel, the single plow blade may be rotated parallel to the longitudinal sides of the vessel and positioned adjacent to the free side of the unloader to act as a dummy vessel side so as to confine the material being reclaimed within the path of the unloader.

BRIEF DESCRIPTION OF THE DRAWINGS

FIG. 3 is a small scale, schematic plan view of the haulage system for moving the vessel under the combined loader and plow apparatus.

DESCRIPTION OF THE PREFERRED EMBODIMENTS

An unloading machine for removing bulk material from a vessel is arranged above and across a slip in a body of water through which the vessel to be unloaded is introduced. The unloading machine is capable of being raised or lowered to accommodate varying water elevations and vessel drafts. The unloader may be mounted on rails whereby it is capable of being propelled longitudinally from end to end of the vessel, or more commonly as shown in FIG. 1, the unloading machine may be fixed and the vessel propelled beneath it by means of an auxiliary rope haulage system or less commonly by the vessel's own power.

In referring to directions in describing this apparatus the longitudinal direction is defined as that parallel to the length of the vessel to be unloaded and the transverse direction is that perpendicular to the length of the vessel or parallel to the width of the vessel.

Figure 1:
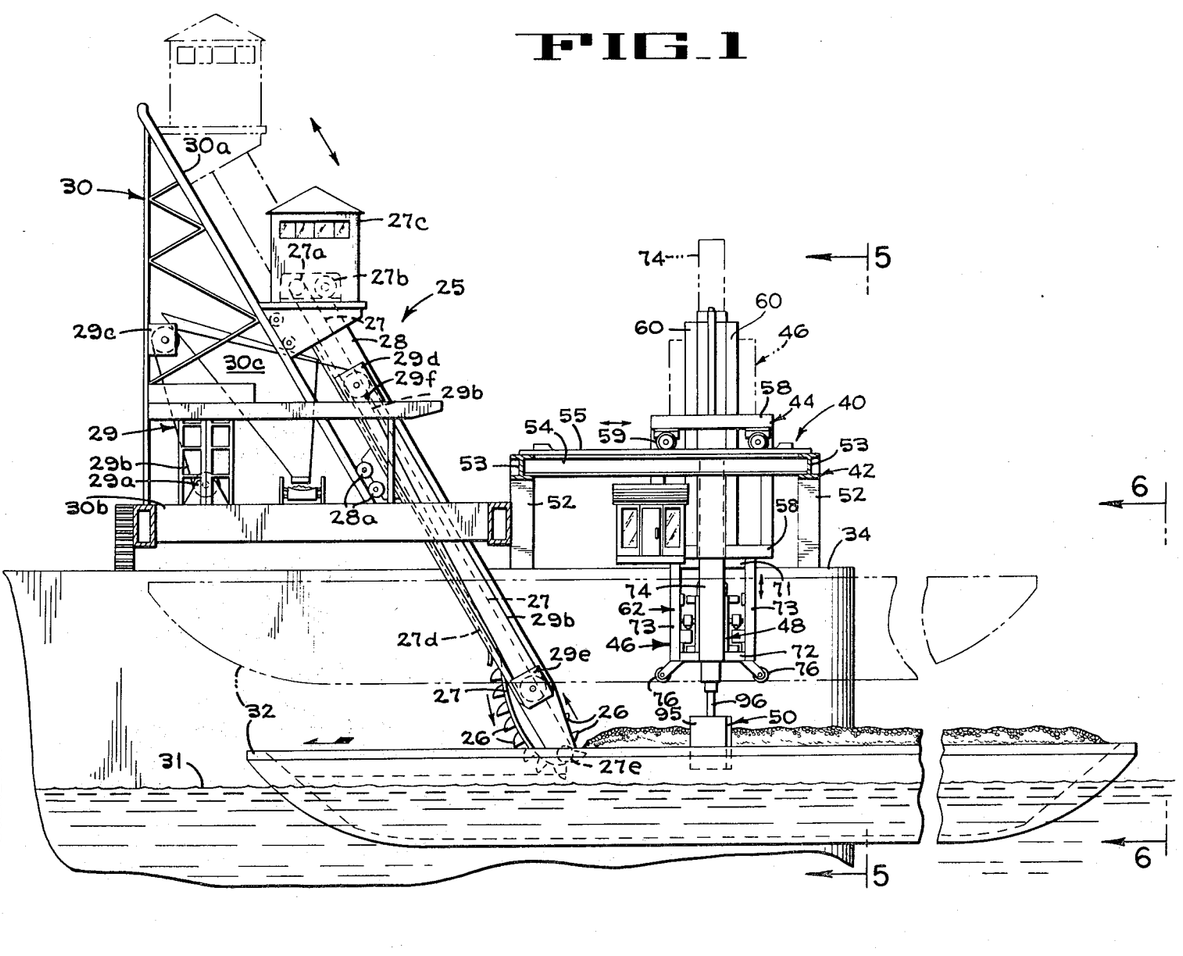
FIG. 1 is a side elevational view of a vessel unloading system using a bucket elevator type of unloader with the plow apparatus of this invention.
Figure 2:
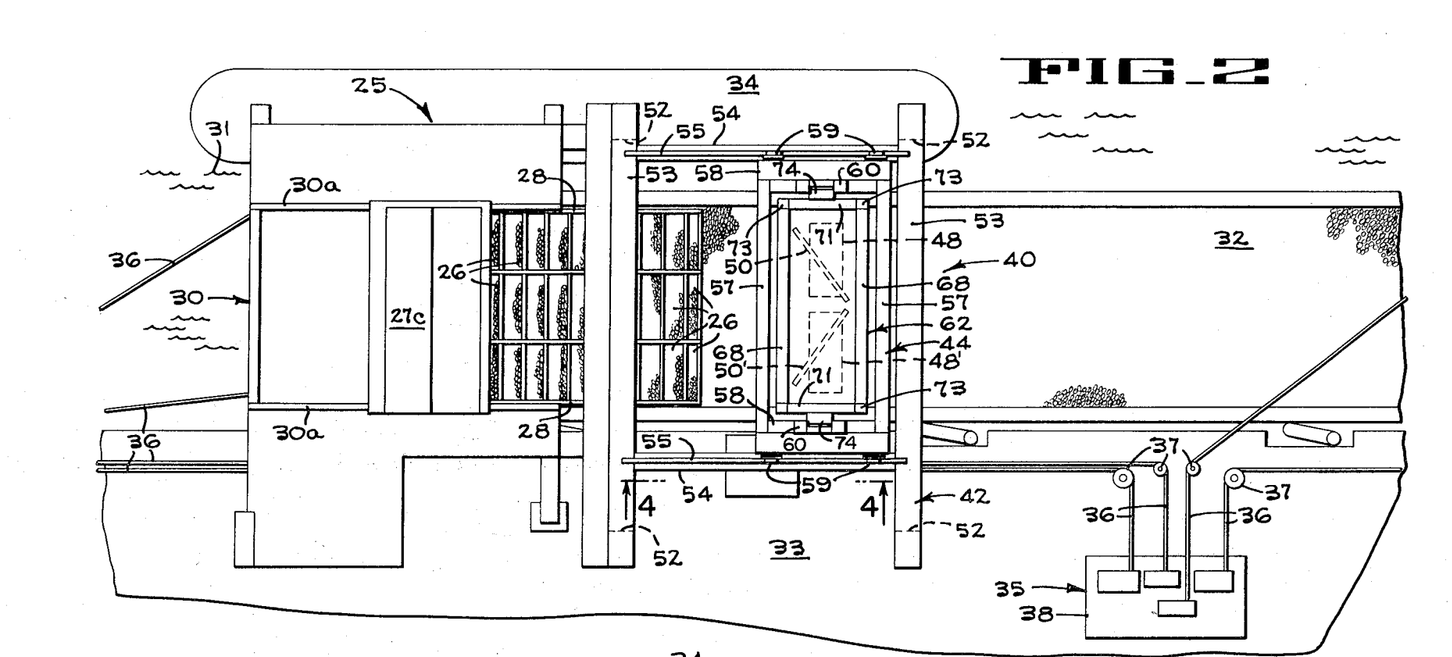
FIG. 2 is a plan view of the vessel unloading system of FIG. 1.
Figure 5:
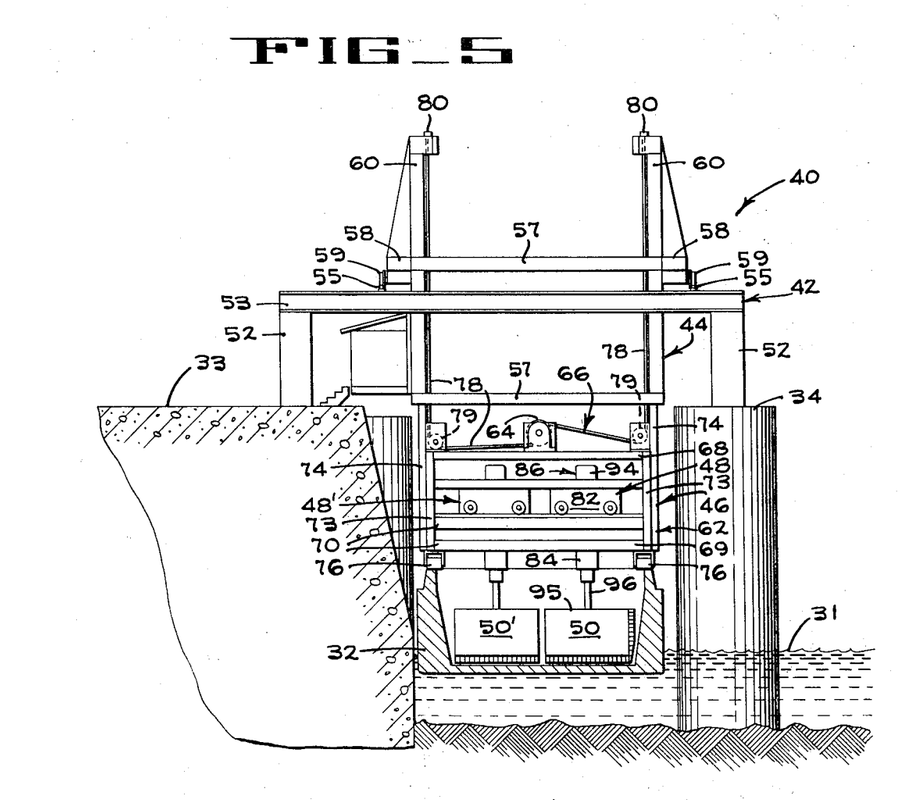
FIG. 5 is a transverse section of the plow apparatus taken along lines 5—5 of FIG. 1.

The type of unloading machine 25 illustrated in FIGS. 1 and 2 is an endless bucket elevator type of machine, although other types of unloaders, such as a rotating bucket wheel reclaimer may be used with similar results. This unloading machine 25 comprises a series of buckets 26 attached to endless chains 27, a movable inclined frmae 28, a hoisting system 29 for the movable frame 28, and a fixed structure 30. On the upward carrying run the chains 27 are supported on rollers mounted on movable frame 28 and then pass over head sprockets 27a which are power driven by a drive 27b in enclosure 27c at the upper end of the movable frame. On the downward return run the chains 27 are supported in guides 27d which are attached to the underside of movable frame 28 and which terminate near the lower end of the movable frame. The chains pass around foot sprockets 27e, located at the lower end of the movable frame. The movable frame 28 is equipped with rollers 28a which engage rails (not shown) mounted on the inclined face 30a of structure 30. The hoisting system 29 comprises a drum type wire rope hoist 29a located on a lower platform 30b of the fixed structure 30. Rope 29b runs vertically from the hoist around a turn sheave in block 29c to a multiple sheave rope block 29d anchored to the fixed structure 30 adjacent the path of the movable frame 28. Rope 29b is then reeved around a sheave of block 29d, down an inclined path along the movable frame 28, around a sheave in multiple sheave block 29e on the lower portion of the movable frame 28, and back up and around a sheave of multiple sheave block 29d. The rope passes between the sheaves of blocks 29d and 29e until finally dead ended at 29f to block 29d which, as indicated, is secured to the fixed structure 30. The position of movable frame 28 is adjustable by the operation of hoist 29a so as to suit the water level and the particular draft of the vessel with its load. The chain and bucket line is power driven by drive 27b so that the buckets at the foot sprocket 27e dig into the material in the vessel to be unloaded, pick up a portion of this material, elevate the material to the head sprockets 27a, and as the buckets pass over the head sprockets, the buckets discharge the material into a collection hopper 30c where it is usually transferred and conveyed to the pier and some more distant point of use. The entire chain and bucket line, together with the movable frame 28 is supported on the fixed structure 30 which spans slip 31 and vessel 32 between a pier 33 and a cell 34 in the channel or river as shown in FIGS. 2 and 5.

The vessel, or barge, to be unloaded is moved into the unloading area by a conventional haulage system 35 shown schematically in FIG. 3. Ropes 36 are secured to the four corners of the vessel 32 and reeved around the necessary turn sheaves 37 to the individual drums on a conventional power operated haulage machine 38. By proper rotation of the drums, the vessel may be propelled either downstream or upstream.

Immediately adjacent to, but upstream of the unloading machine 25, a plow apparatus 40 of this invention is positioned, as shown in FIGS. 1 and 2. Like the unloading machine, the plow apparatus spans the slip 31 and the vessel 32 to extend between the pier 33 and the cell 34. The plow apparatus 40 comprises a fixed supporting structure 42, a longitudinally movable transverse bridge 44, an elevator 46, a pair of transversely movable carriages 48 and a pair of plows 50.

The fixed supporting structure 42 for the plow apparatus is a heavy rectangular structural steel unit having vertical columns 52 mounted on the pier 33, or shore side of the vessel, and on the cell 34 out in the water. Transverse girders 53 span the distance between the pier and the cell over and above the vessel to be unloaded. Longitudinal beams 54, parallel to the length of the vessel, complete the main structure. These girders 53 and beams 54 are securely connected together and to the columns 52 to form a single rigid open structure for supporting the plow apparatus. Rails 55 are mounted on the longitudinal beams 54 to provide tracks for the longitudinally movable transverse bridge 44.

The transverse bridge 44 is movable parallel to the length of the vessel. This bridge has a heavy structural steel frame comprising transverse beams 57 and longitudinal beams 58. Rollers 59 are rotatably mounted on the frame of bridge 44 which runs on the rails 55. The longitudinal motion of bridge 44 is power operated in a conventional manner by such means as a fixed rack on the supporting structure 42 and a powered pinion on the bridge 44 or a chain and sprocket drive. Bridge 44 is further provided with vertical guideways 60 to control the vertical movement of the elevator 46.

Figure 6:
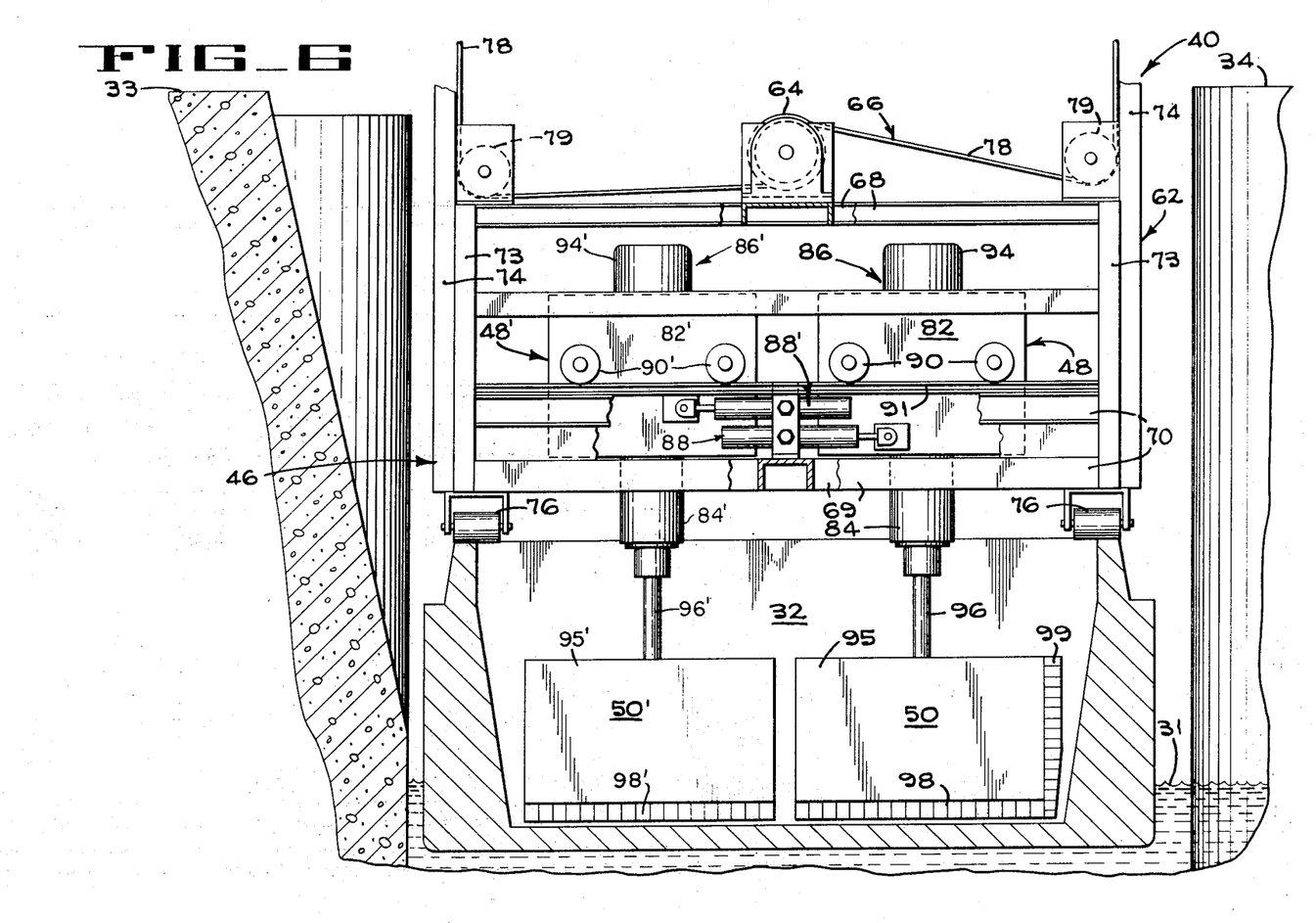
FIG. 6 is an enlarged section taken along lines 6—6 of FIG. 1 showing the elevator, transverse carriages and the plows.

The elevator 46, as shown in FIGS. 2, 5 and 6, comprises an elevator frame 62, a hoisting machine 64 and a rope reeving system 66. Upper transverse beams 68, lower transverse beams 69 and intermediate transverse beams 70, together with longitudinal end members 71, 72 and vertical members 73, define the elevator frame 62 which is in the form of a longitudinally narrow box-like structure. Vertical guides 74, which ride in the mating guideways 60 on the bridge 44, are secured to the ends of the elevator frame. Rollers 76 may be provided on the bottom of the elevator frame 62 to position the elevator on the top of the sides of the vessel being unloaded. The power operated drum type hoisting machine 64 is mounted on the top of the elevator frame 62 at about the mid-span of the transverse width of the elevator frame. Ropes 78 are led horizontally from the drums of the hoisting machine 64 and are guided around turn sheaves 79 to run vertically adjacent to the guides 74 to deadend attachment points 80 at the top of guideways 60. By rotating the drums of the hoisting machine 64 counter-clockwise, as viewed in FIG. 6, the ropes are wound up on the drums, shortening the length of the unwound ropes and thus causing the elevator 46 to be raised. Reversing the direction of rotation of the drums will cause the elevator to be lowered.

The pair of transversely movable plow carriages 48, as shown in FIG. 6, is supported on the intermediate transverse beams 70 of the elevator frame 62. Each of the two carriages 48 and 48' is alike so only one will be described with th prime mark (') indicating like parts. The carriage 48 comprises a carriage frame 82, a plow support assembly 84, a plow rotating drive 86 and carriage transversing means 88. The carriage frame is a structural unit on which rollers 90 are rotatably mounted to run on rails 91 secured to the intermediate beams 70. Transversing means 88, secured to the elevator frame 62, comprises a pair of linear actuators, one of which is connected to each of the carriage frames 82. These actuators may be of a pneumatic or hydraulic piston and cylinder type power unit, or other similar linear actuators, to provide individually operable reciprocal movement of the carriages transverse of the vessel. Each carriage further contains a support assembly 84 for the plow 50 having bearings 92 and 93 for rotatably supporting the plow about a vertical axis. The plow rotating drive 86 consists of a motorized reducer 94, supported on the top of each carriage frame 82 and drivingly connected to each plow, such as by a pinion on the output shaft of the reducer mating with a gear on the upper end of the plow, not shown.

Each of the two plows 50 and 50' is alike so only one will be described. Plow 50 comprises an approximately rectangular blade or plate member 95 and a vertical shaft 96. This shaft projects upwardly into the plow support assembly 84 and extends to the plow rotating drive 86. The plow blade 95 may be further provided with flexible, elastomeric type strips 98 and 99 secured to the bottom edge and to at least one of the vertical side edges to more closely conform to the sides of the vessel involved as shown on FIGS. 4 and 6.

Figure 16:
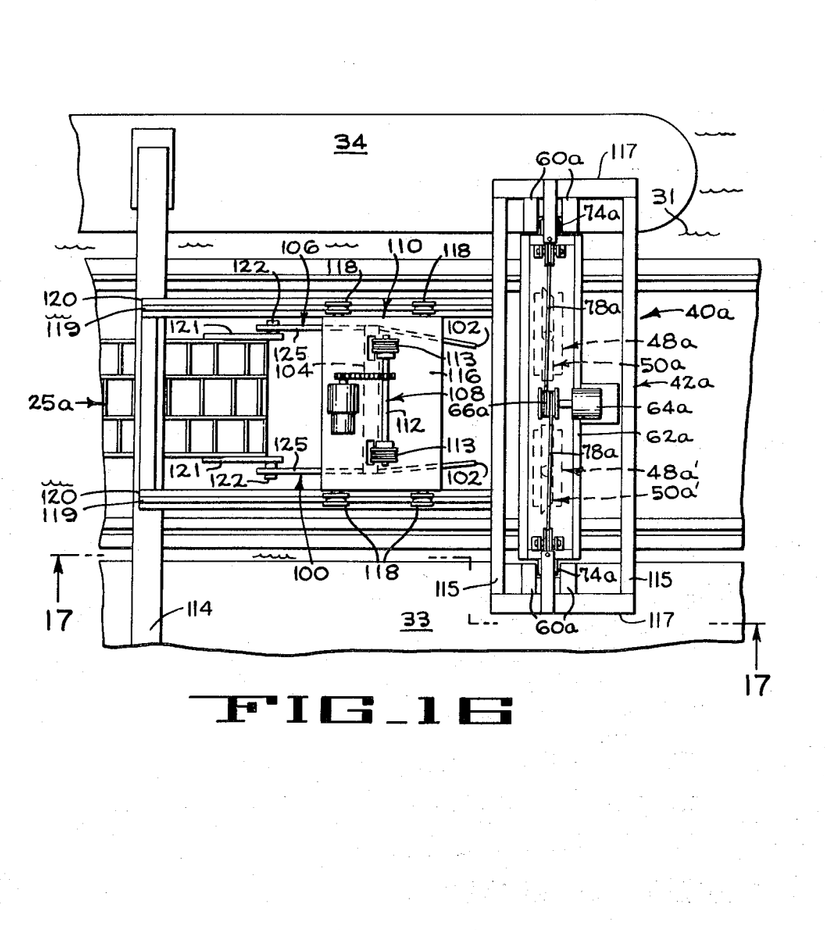
FIG. 16 is a plan view of an alternate, second embodiment, of the plow apparatus showing the use of a movable auxiliary skirt plate assembly.
Figure 17:
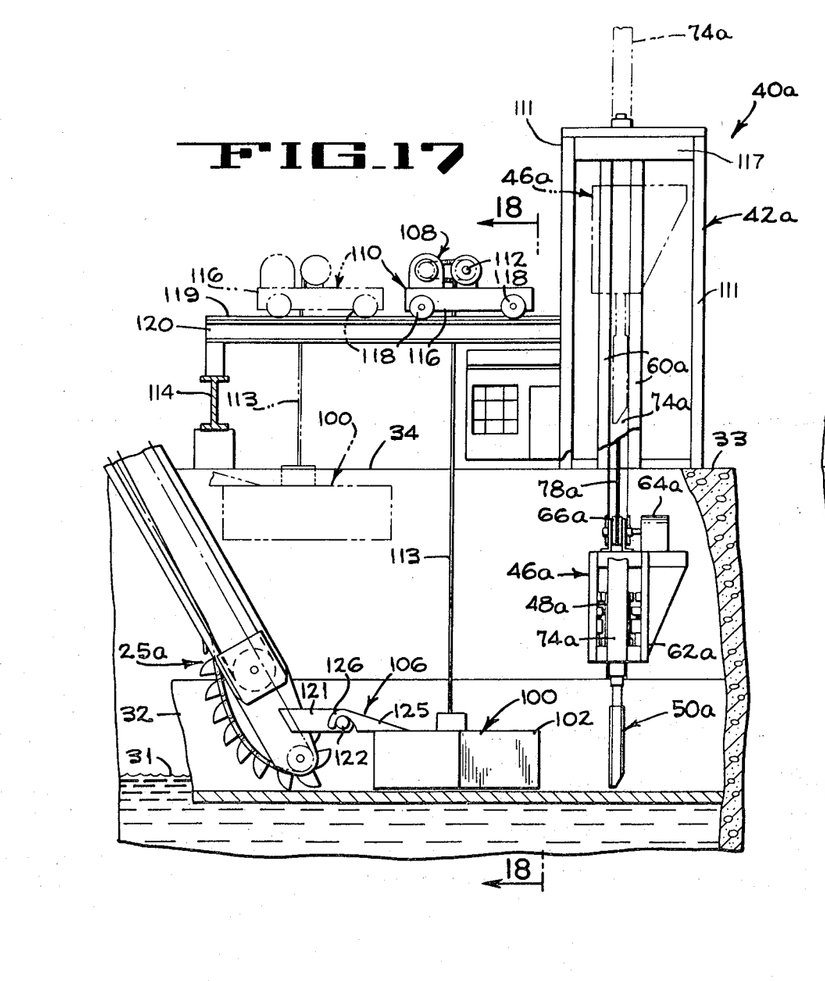
FIG. 17 is a longitudinal section of the second embodiment taken along lines 17—17 of FIG. 16.
Figure 18:
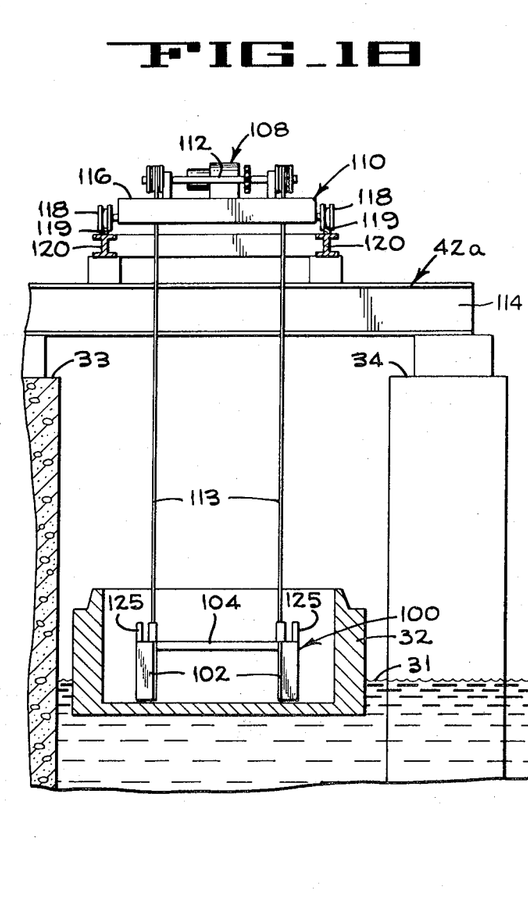
FIG. 18 is a transverse section of the auxiliary movable skirt assembly taken along lines 18—18 of FIG. 17.

A second embodiment of this invention is shown on FIGS. 16–18. In this embodiment the plow mechanism 40a comprises a fixed supporting structure 42a, an elevator 46a, a pair of transversely movable carriages 48a and 48a', a pair of rotatable plows 50a and 50a', an auxiliary skirt assembly 100, a hoist unit 108 for the skirt assembly, and a longitudinally transversing trolley 110 for the skirt assembly. The plow mechanism 40a is similar to the plow mechanism 40 of the first embodiment with the exception that no longitudinally movable transverse bridge 44 (FIGS. 1 and 4) is provided. The elevator 46a, the transversely movable carriages 48a and the rotatable plows 50a are arranged, in a direction transverse of the vessel, in a similar manner to that shown on FIG. 6.

The fixed supporting structure 42a is a heavy structural steel unit having vertical columns 111 mounted on the pier 33 and on the cell 34 out in the water. Transverse girders 114 and 115 span the distance between the pier and the cell over and above the vessel to be unloaded. Longitudinal beams 117 are securely connected to the transverse girders 115 and to the top of the vertical columns 111 for supporting the elevator 46a. Guideways 60a are provided in the transverse ends of the frame to guide the vertical movement of elevator 46a. Additional longitudinal beams 120 are secured to this structure at an intermediate elevation and to shorter columns at the opposite ends of these beams for supporting the trolley 110. Rails 119 are mounted on the top of beams 120. The above beams and columns are securely connected together to form a single rigid open structure as indicated in FIG. 17.

The elevator 46a, as shown in FIG. 17, comprises an elevator frame 62a, a hoisting machine 64a and a rope reeving system 66a. The elevator frame 62a is a narrow elongated structure with a trapezoidal cross-section. In a direction transverse of the vessel the elevator frame is similar to that shown on FIG. 6. The top of this frame is widened to provide a platform for the hoisting machine 64a and a walkway for servicing the equipment. Vertical guides 74a are secured to the transverse ends of the elevator frame which operate in mating guideways 60a in the support frame 42a in a similar manner to that provided within the longitudinally movable bridge 44 of the first embodiment. The power operated drum type hoisting machine 64a is mounted on the top platform of the elevator frame 62a at about the midspan of the elevator. Ropes 78a are led horizontally from the drums of the hoisting machine 64a and are guided around turn sheaves to run vertically to dead end attachment points at the top of frame 42a in a similar manner to that shown on FIG. 5.

The pair of transversely movable carriages 48a is essentially the same as that described for the first embodiment and as shown in FIG. 6. Each carriage comprises a carriage frame, a plot support assembly, a plow rotating drive and carriage transversing means.

Figure 4:
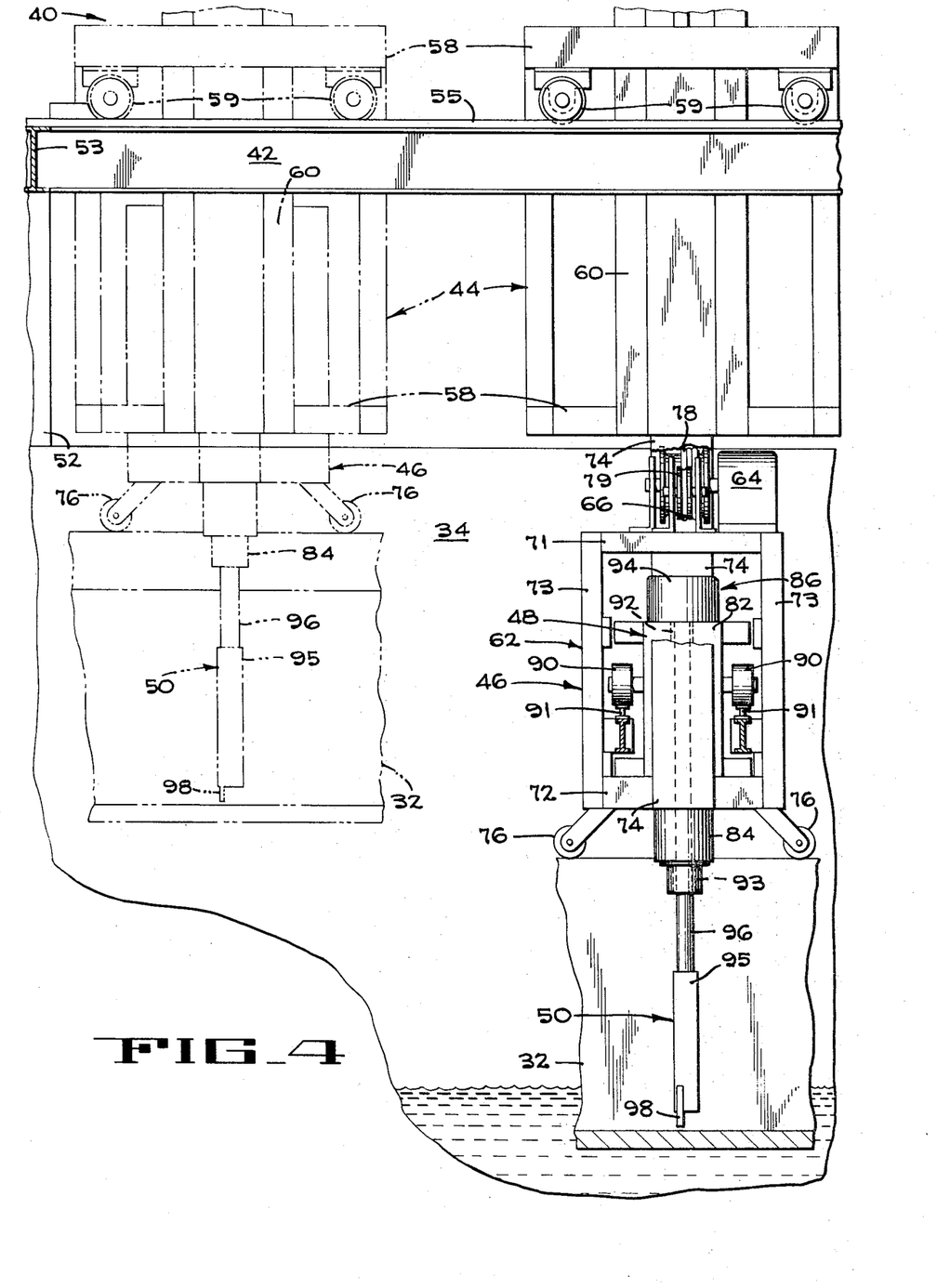
FIG. 4 is an enlarged side elevation of the plow apparatus as indicated by the lines 4—4 of FIG. 2 showing the plow mechanism in a lowered position when the water level is low (in solid lines) and also in a raised position when the water level is high (in dotted lines).

Each plow 50a and 50a' is essentially the same as that described for the first embodiment. Each plow comprises an approximately rectangular blade or plate member and a vertical shaft. This shaft projects upwardly into the plow support assembly and extends to the plow rotating drive in the carriage 48a. The plow blade may be further provided with flexible, elastomeric type strips secured to the bottom edge and to at least one of the vertical edges to more closely conform to the sides of the vessel in the same manner as shown in FIGS. 4 and 6.

The plows 50a and 50a' of this embodiment are further supplemented by the auxiliary skirt assembly 100. This skirt assembly comprises a pair of skirt plates 102 tied together with a cross-member 104, a flexible connection 106 to the foot of the unloading machine. This skirt assembly 100 is located between the unloading machine 25a and the plows 50a. The skirt plates 102 are normally positioned to be parallel with the longitudinal sides of the vessel and the forward ends of skirt plates 102 may be bent inwardly toward the center of the vessel, as shown in FIG. 16, to direct the material more closely into the path of the unloader. The hoist unit 108 is a wire rope powered winch 112 having one end of its rope 113 secured to the skirt plate assembly 100. The hoist unit 108 is mounted on trolley 110 which comprises frame 116 equipped with rollers 118 free to run on rails 119 on the fixed support structure 42a. These rails extend in a longitudinal direction parallel to the length of vessel 32. The flexible connection 106 provides a tie between the motion of the unloading machine 25a and the skirt assembly 100. As the unloading machine is raised on its inclined track, moving downstream to accommodate different positions of water level or vessel draft, the unloading machine will pull the skirt assembly downstream also as the trolley 110 is free to move longitudinally accordingly to maintain the same relative spacing between the unloader and the skirt assembly. In the embodiment shown on FIG. 17, the flexible connection 106 is comprised of a pair of bar members 121 secured to the lower part of the unloading machine frame and projecting horizontally upstream. Each bar member carries a pin member 122 near its free end. Another pair of bar members 125 each having a hook portion 126 near its free end is attached to the skirt assembly 100. In operation, the skirt assembly is raised and positioned adjacent to the foot of the unloading machine, then the skirt assembly is lowered so that the hook portions 126 engage the pin members 122. Slight differences in elevation between the unloading machine and the skirt assembly can be accommodated by the self-aligning feature of the hook portions 126 on the pin members 122.

Figure 19:
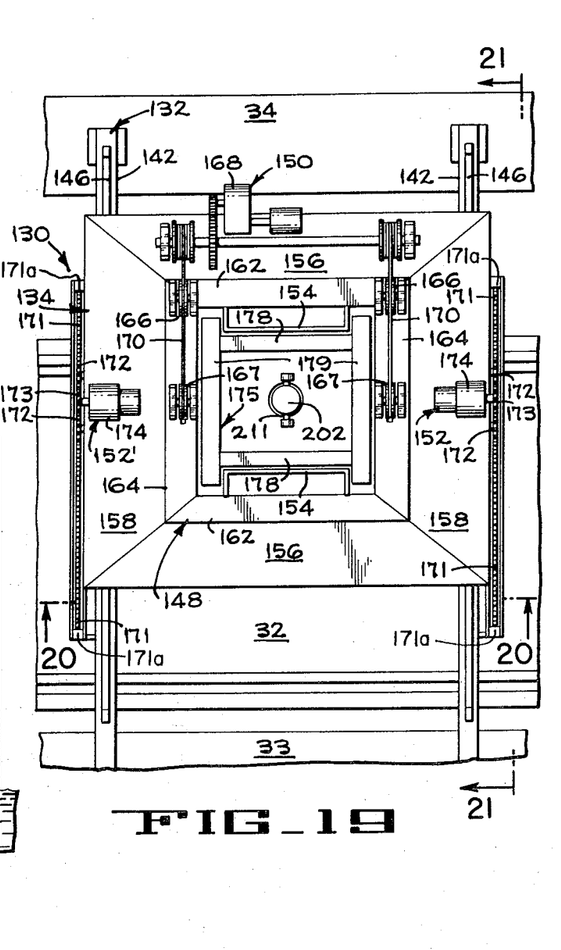
FIG. 19 is a plan view of an alternate, third embodiment, of the plow apparatus showing the use of a single plow assembly.
Figure 20:
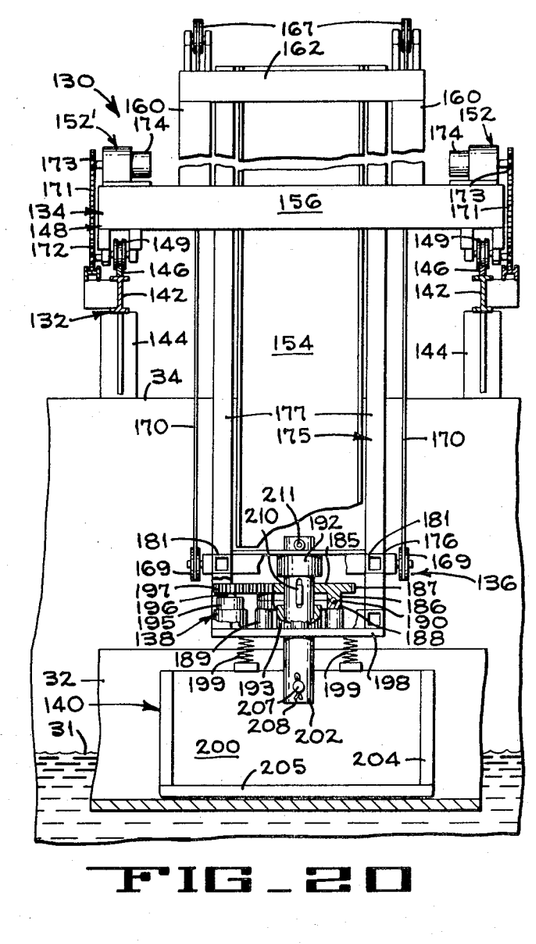
FIG. 20 is a longitudinal section of the third embodiment taken along lines 20—20 of FIG. 19.
Figure 21:
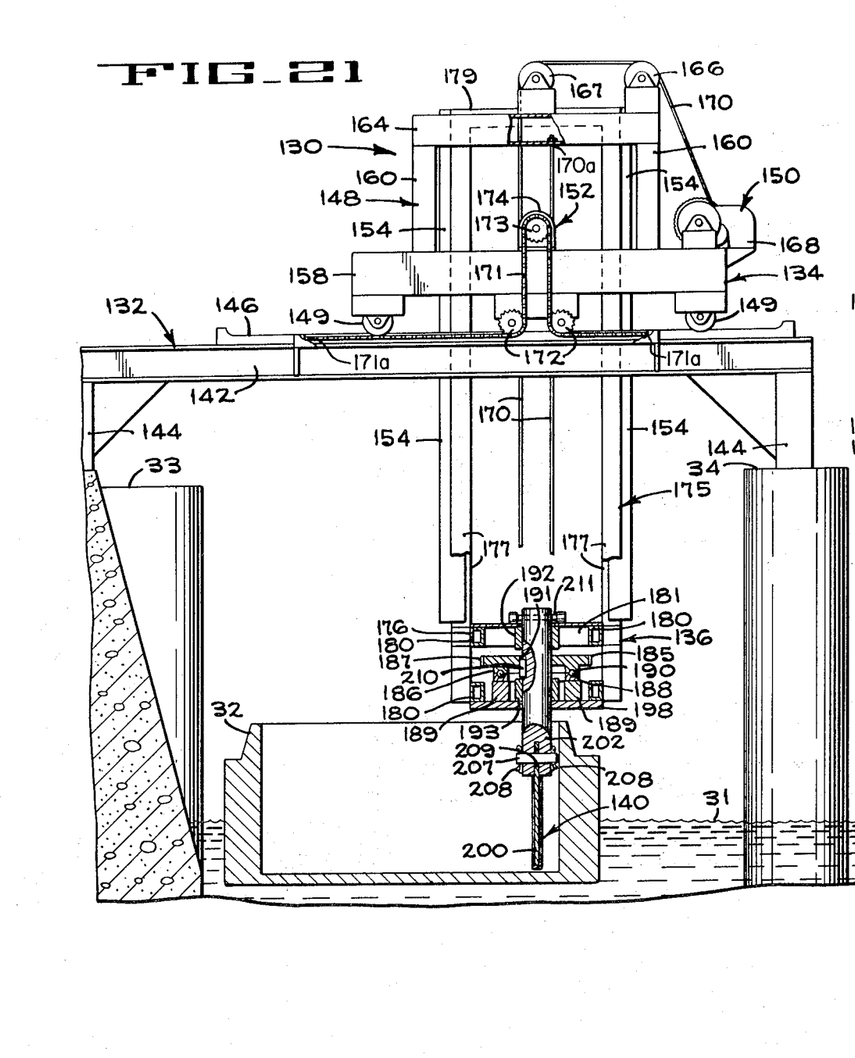
FIG. 21 is a transverse section of the third embodiment taken along lines 21—21 of FIG. 19.

The plow apparatus 130 of the third embodiment of this invention is shown in FIGS. 19–21 and utilizes a single transversely movable plow. This plow apparatus 130 comprises a fixed supporting frame 132, a transversely movable carriage 134, a vertically movable elevator 136, a plow rotating drive 138, and a plow 140 which is rotatable about a vertical axis.

The supporting frame 132 of this plow apparatus comprises a pair of transverse beams 142, a pair of vertical columns 144 for each transverse beam 142 and a rail 146 mounted on top of each of the transverse beams 142. The frame 132 spans the slip 31, from pier 33 to cell 34, at a suitable elevation to clear the vessel 32 being unloaded.

The transversely movable carriage 134 comprises a structural steel frame 148 having wheels 149 rotatably mounted to the underside thereof and engageable with the rails 146, a wire rope hoist assembly 150 and a pair of traversing drives 152. Vertical guideways 154 are provided on each of the longitudinal ends of the carriage frame 148 to guide the elevator 136 as it moves vertically. The carriage frame further comprises a pair of longitudinal base beams 156 and a pair of transverse base beams 158 secured together to form a platform portion on which columns 160 are vertically mounted inwardly of the ends of beams 156 and 158. The columns 160 have longitudinal top beams 162 and transverse top beams 164 secured to each other and to the columns to form a rigid superstructure. Turn sheaves 166 and 167 are mounted on the top of the superstructure of carriage frame 148 (FIG. 21) and a powered wire rope double drum type hoist unit 168 is mounted on the platform portion of the carriage frame 148. A pair of wire ropes 170 is reeved from the drums of the hoist unit 168 vertically upward and over turn sheaves 166 and 167 and then downwardly to a third set of turn sheaves 169 attached to the elevator 136.

From the turn sheaves 169 (FIG. 20) the ropes 170 run vertically upward and the ropes are dead-ended at 170a (FIG. 21) to the transverse top beams 164. Thus, the elevator 136 can be raised or lowered by the hoist unit 168 through a two part rope system on each longitudinal end of the carriage frame 148.

The carriage 134 is moved transversely by a pair of traversing drives 152 (FIG. 20), each centrally located on one of the longitudinal ends of the platform portion of the carriage frame 138. The drives 152 and 152', which are alike so only one will be described, each comprise a chain 171, a pair of turn sprockets 172, a drive sprocket 173 and a motorized gear reducer 174. Chain 171 (FIG. 21) is used as a flexible gear rack to propel the carriage and each of its ends is secured to one of the transverse beams 142 of the supporting frame 132. Between the ends of chain 171, the chain passes around turn sprockets 172, which are rotatably mounted on the underside of the movable carriage frame 148. From the turn sprockets 172, a loop of chain 171 passes around drive sprocket 173 which is drivingly mounted on the output shaft of the motorized gear reducer 174. The reducer 174 is attached to the platform portion of the carriage frame 148. Thus, as the reducers are driven, drive sprockets 173 are rotated and since the reducers are fixed to the carriage 134 and the ends of the chain are attached at 171a to the transverse beams 142 supporting the carriage, the carriage 134 is then pulled along chains 171 to obtain movement of the carriage.

The elevator 136 is vertically movable within carriage 134 so as to obtain vertical adjustment of the position of plow 140 with respect to vessel 32 and/or the level of the water in the slip 31. Elevator 136 comprises an elevator frame 175, the turn sheaves 169 for the elevator hoist assembly 150, and a machinery support platform 176. The elevator frame 175 is a square shaped elongated structural steel framework comprising vertical columns 177, upper pairs of longitudinal beams 178 and transverse beams 179 (FIG. 19) connected to the top of columns 177, and lower pairs of longitudinal beams 180 and transverse beams 181 (FIG. 21) connected to the bottom of the columns 177 to form the lower platform 176 for supporting the plow and the plow rotating machinery. The longitudinal beams 178 and 180 are positioned inwardly of the ends of transverse beams 19 and 181 and together with columns 177 form guides mating with the guideways 154, attached to the carriage frame 148, as indicated in FIG. 19 to control the vertical movement of elevator 36.

A large diameter annular combination radial bearing and ring gear 185 (FIG. 21) is concentrically supported at a proper elevation in the lower platform portion 176 of the elevator frame 175. The bearing 185 has an upper race 186 with gear teeth cut in its external periphery to form a ring gear 187, a lower race 188 fastened to pedestals 189 secured to the lower platform 176 and ball or roller elements 190 mounted between races 186 and 188. The upper race 186 further has a keyway or spline 191 provided on its inner diameter to provide a vertically slidable driving connection between the ring gear 187 and the plow 140. The lower platform portion 176 of the elevator frame 175 further supports upper and lower guide bushings 192 and 193 for the plow 140.

The plow rotating drive 138 comprises a motor driven worm gear reducer 195 (FIG. 20) with a vertical output shaft 196, a pinion 197 mounted on the output shaft of the reducer 195, and the ring gear 187 of the combination bearing and gear 185. The reducer 195 is mounted on the lower platform portion 176 of the elevator frame 175 so that the pinion 197 is positioned in mating, driving relation with the ring gear 187. A plate 198 is attached to the bottom of the platform portion 176 of the elevator frame to provide a seating surface for the tops of a pair of springs 199 attached to the plow 140 for a purpose to be described hereinafter.

The plow 140 comprises an approximately rectangular blade or plate member 200 and a vertical drive tube or shaft 202. The plow blade 200 may be further provided with flexible, elastomeric type strips 204 and 205 secured to each vertical side edge and to the bottom edge to move closely conform to the side and bottom of the vessel involved as shown in FIG. 20 and 21. The lower end of drive tube 202 is attached to the upper part of the blade 200 at the mid-length of the blade with a horizontal lower pin 207 to form a pivotal connection. Pin 207 is held in place in the drive tube 202 with locking pins 208, such as cotter pins, and the mating hole 209 in the plow blade has clearance with pin 207 so the plow blade is free to pivot. The plow blade is thus able to tilt in a vertical plane, about the horizontal axis of pin 207, to conform to any slight list in the vessel as it is unloaded without putting excessive strain on the drive tube 202 or the elevator 136. The plow drive tube 202 is free to move a limited amount vertically within the upper and lower guide bushings 192 and 193, mounted on the platform portion 176 of the elevator frame, to accommodate any slight vertical change due to the tilting of the plow and/or the list or slight change in elevation of the vessel during unloading. A key, or spline, 210 is provided on the outer periphery of drive tube 202, at a vertical location in alignment with the keyway, or spline, 191 in the upper bearing race 186. The vertical gap, or space, between the upper guide bushing 192 and the lower guide bushing 193 is sufficient to provide for the limited vertical movement of the drive tube 202 with its attached key 210, without interfering with the guide bushings. The upper end of the plow drive tube is supported on the upper end of the platform portion 176 of the elevator frame on an upper horizontal pin 211 so that the plow 140 will be raised or lowered as the elevator 136 is raised or lowered. Since drive shaft 202 is rotatable, with respect to the upper end of the platform portion on which pin 211 is supported, pin 211 may be equipped with rollers on each of its projecting ends, if desired, to reduce the frictional forces involved in rotating the plow.

Due to the provision for limited vertical movement of the plow drive tube 202 and the pivotal capability of the plow blade 200, a pair of compression springs 199 (FIG. 20) is provided between the annular plate 198, on the bottom portion of the elevator 136, and the top of plow blade 200 as indicated in FIGS. 20-21. One spring 199 is mounted laterally on each side of drive tube 202 to the top horizontal edge of the plow blade 200 and the top end of each spring bears against the annular plate 198. These compressed springs 199 provide pressure on the plow blade 200 to help keep the bottom of the plow blade in contact with the inside bottom surface of the vessel, or the material in the vessel, during any tilting of the vessel so thorough cleaning of the material in the vessel may be accomplished by the unloading machine 25.

OPERATION

Figure 7:
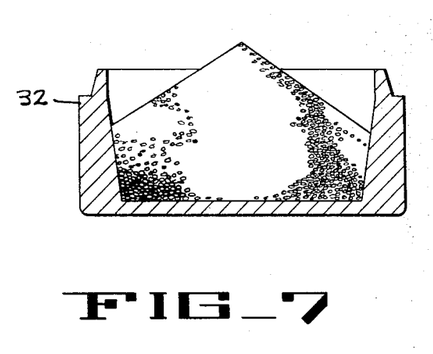
FIG. 7 is a schematic transverse section of a loaded vessel.
Figure 8:
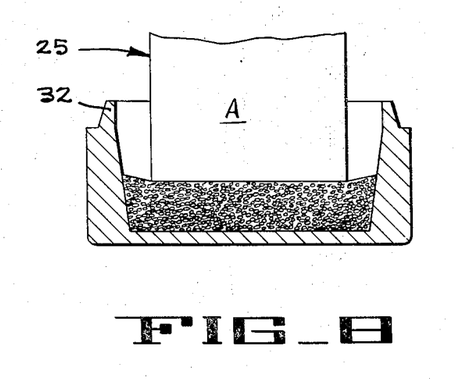
FIG. 8 is a schematic transverse section of the vessel showing the unloading machine located in the centerline of the vessel taking the first cut on the material in the vessel.
Figure 9:
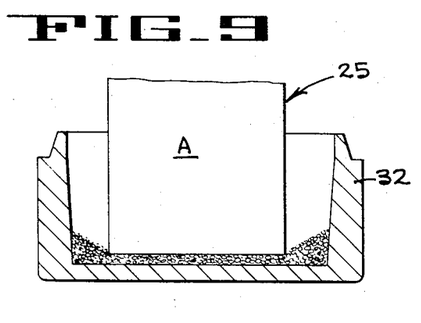
FIG. 9 is a schematic transverse section of the vessel showing the centrally positioned unloading machine taking its second cut in the material leaving material on the sides of the vessel.
Figure 10:
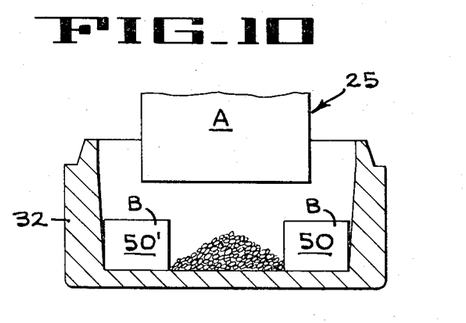
FIG. 10 is a schematic transverse section of the vessel showing the centrally positioned unloading machine raised after taking its second cut as per FIG. 8, and showing the plow blades set at an angle so as to push the material on the sides in toward the center of the vessel.
Figure 11:
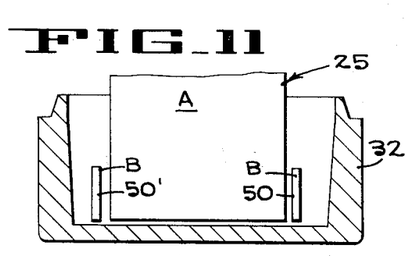
FIG. 11 is a schematic transverse section of the vessel showing the plow blades positioned parallel to the longitudinal sides of the vessel and acting as material retaining skirts while the unloading machine is taking its final pass to pick up the remaining material.
Figure 12:
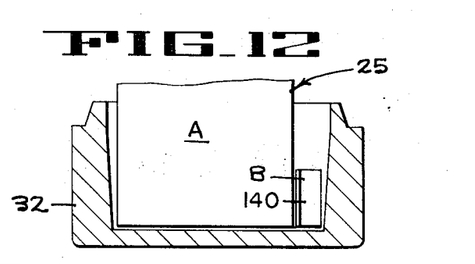
FIG. 12 is a schematic transverse section of the vessel, similar to FIGS. 10 and 11, showing an alternate embodiment using a single plow blade with the unloading machine positioned adjacent to the opposite side of the vessel.

For the purpose of illustrating the operation of the invention, a loaded barge is indicated in FIG. 7. If the width of a vessel is greater than the width of the unloading machine or unloader, the vessel is brought into position with one end immediately below the lower end of the unloading machine and the unloader is lowered into the vessel to start digging as shown (in solid lines) in FIG. 1. The longitudinal motion of the vessel is then started while the unloader is digging and removing material. Generally, the removal of all the material in one pass along the length of the vessel is impractical, due to the stability and structural characteristics of the vessel; therefore, more than one pass of the unloader is required. The first pass is taken along the longitudinal centerline of the vessel schematically shown in FIG. 8 where "A" indicates the unloader. Should a second pass be required to clean out the center of the vessel (FIG. 9) it would be necessary to return the vessel to the starting point. When the center is clean or nearly clean the plows "B," shown in FIG. 10, are lowered into the vessel and rotated to an angle so the material on the sides is deflected to the center as the longitudinal motion of the vessel is started. This can be accomplished on the return pass, if desired, so that the material on the sides is in position for reclaiming on a subsequent digging pass. During this subsequent digging pass, the plows can be reoriented, as shown in FIG. 11, so that the plows are parallel to the sides of the vessel and positioned adjacent to the sides of the unloader to act as false vessel sides during the digging pass. Alternately, the plowing may be done during the digging pass where the plows, arranged immediately ahead of the unloader, work in conjunction with the bucket line of the unloader. It is also apparent that a single plow 140 can be used, as shown in FIG. 12 and as further described in connection with the third embodiment shown in FIGS. 19–21, in the event the unloader is offset from the centerline of the vessel so one side of the vessel is cleaned completely by the bucket line of the unloader.

Figures 13, 14:
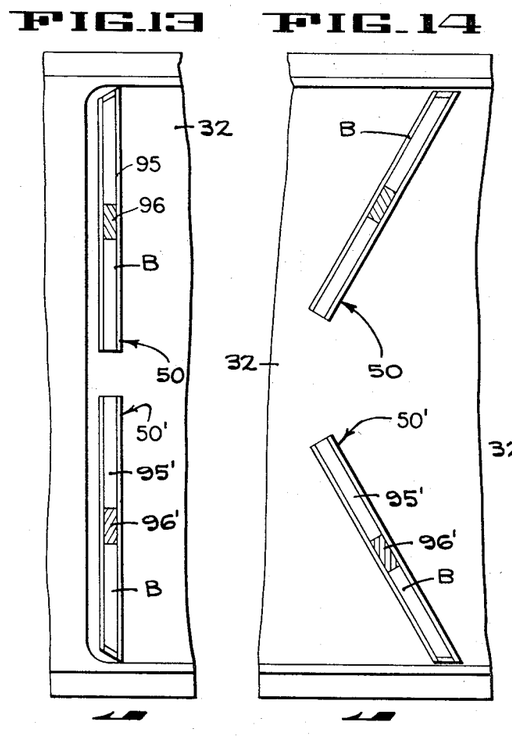
FIG. 13 is a partial plan view of the vessel showing the plow blades positioned as they enter the stern-end of the vessel.
FIG. 14 is a partial plan view of the vessel showing the plow blades rotated to oppositely angled positions during the main travel of the vessel past the unloading machine and the plow apparatus as indicated in FIG. 10.
Figure 15:
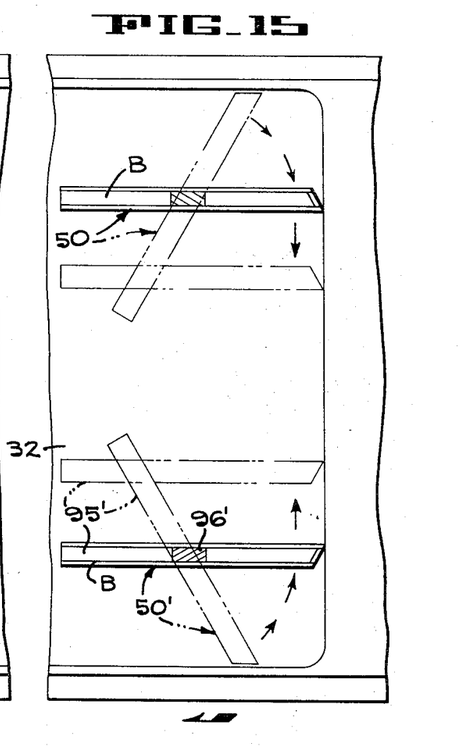
FIG. 15 is a partial plan view of the vessel showing (in solid and dotted lines) the plow blades as they are rotated at the blow end of the vessel to clean out the bow end corners of the vessel and showing (in dashed lines) the plow blades as they are positioned as skirts during the cleanup pass of the unloading machine per FIG. 11.

FIGS. 13, 14 and 15 illustrate the relative positions of the plow blades during their operation. The plow blades are first lowered into the stern end of the vessel perpendicular to the sides of the vessel, as shown in FIG. 13, and the movement of the vessel is toward the left as indicated by the directional arrow. During the travel of the vessel the plow blades are partially rotated into the position shown in FIG. 14 so the material at the sides is deflected toward the center. FIG. 15 illustrates how the plows can be rotated at the bow end of the vessel to clean out the corners and the plows can then be moved laterally toward the center to push this material to where it can be more readily reclaimed.

In the alternate embodiment shown in FIGS. 16–18, the auxiliary skirts 100 are particularly useful in the cleanup of extra wide, or jumbo, barges. The rotatable plows are positioned to deflect the material toward the center and within the spacing of the skirt assembly which is located between the plows and the unloader. The deflected material is then confined by the skirt plates, spaced only slightly wider than the bucket line of the unloader, during the digging pass so the unloader can reclaim practically all of this material.

Although the best mode contemplated for carrying out the present invention has been herein shown and described, it will be apparent that modifications and variations may be made without departing from what is regarded to be the subject matter of this invention.

I claim:

1. In a system for unloading loose bulk material from a marine vessel located adjacent a shore installation, said system having an unloading machine for reclaiming and elevating the material from inside the vessel as the vessel moves longitudinally past the unloading machine, the improvement which comprises at least one plow supported from the shore and located in the vessel to engage the material in advance of and working cooperatively with the unloading machine, said plow having a planar material engaging surface, means mounting said plow for both lateral and vertical motion with respect to the vessel, means supporting said plow for angular motion about a vertical axis to various selected angular positions of said planar surface with respect to the longitudinal sides of the vessel so said planar surface can deflect material from the corners, the ends and the sides of the vessel into the path of the unloading machine as the vessel is moved past the plow, and means for driving said plow to produce said angular, lateral and vertical motions.

2. In a system requiring a minimum amount of cleanup for unloading loose bulk material from a marine vessel adjacent a shore installation, the apparatus which comprises in combination:
   a. an unloading machine mounted on the shore for reclaiming and elevating the material from the vessel in one or more passes as the vessel is moved longitudinally past the unloading machine, said unloading machine being adjustable vertically to vary its digging depth in the material in the vessel and being of a width narrower than the inside width of the vessel, and
   b. at least one plow located to engage the material in the vessel in advance of the unloading machine, said plow having a vertical planar surface adjustably positioned at an angle with respect to the longitudinal sides of the vessel so as to push material from adjacent the sides of the vessel into the path of the unloading machine for recovery of said material as the vessel is moved past, said plow shiftable parallel to the longitudinal sides of the vessel so as to act as a retaining skirt, during the reclaiming operation of the unloading machine, for the material pushed into the path of the unloading machine by said plow during a preceding pass.

3. The apparatus of claim 2 wherein said plow further comprises an approximately rectangular vertical plow blade and a vertical shaft attached to said plow blade at the mid-point of the horizontal dimension of said plow blade.

4. The apparatus of claim 3 wherein said plow further comprises a flexible elastomeric type strip attached to the bottom edge of said plow blade and a flexible elastomeric type strip attached to one vertical edge of said plow blade to more closely conform to the bottom and sides of the vessel.

5. The apparatus of claim 2 wherein a carriage is provided to rotatably support said plow, said carriage being horizontally movable transversely of the vessel.

6. The apparatus of claim 5 wherein a drive is provided to rotate said plow shaft.

7. The apparatus of claim 5 wherein linear actuating means is provided to move said plow carriage transversely of the vessel.

8. The apparatus of claim 5 wherein an elevator is provided to carry said transversely movable carriage, said elevator being movable in a vertical direction to adjust the elevation of said plow with respect to said vessel.

9. The apparatus of claim 8 wherein a fixed supporting structure is provided, said structure spanning the width of the vessel and positioned at an elevation so that the vessel may move longitudinally thereunder, said structure further supporting and guiding said elevator in its vertical movement of said elevator.

10. The apparatus of claim 9 wherein a power operated wire rope hoist system is provided on said elevator, one end of the hoist rope system being attached to said supporting structure, said hoist system capable of raising and lowering said elevator.

11. The apparatus of claim 9 wherein said auxiliary skirt assembly further comprises a trolley movable in a longitudinal direction, said skirt assembly being suspended from said trolley, said trolley having a hoist for adjusting the vertical position of said skirt assembly.

12. The apparatus of claim 11 wherein said auxiliary skirt assembly further comprises a flexible connection between said skirt assembly and said unloading machine so that as the unloading machine moves longitudinally along its inclined path said flexible connection pulls said skirt assembly, suspended from said trolley, a corresponding amount longitudinally to maintain the skirt assembly in its same relative position just ahead of said digging portion of the unloading machine.

13. Plow apparatus to reduce the amount of cleanup used with an unloading machine for reclaiming and elevating loose bulk material from a marine vessel adjacent a pier as the vessel is moved past the unloading machine in one or more longitudinal passes, the combination which comprises:
 a. at least one plow positioned ahead of the unloading machine, said plow having a relatively wide vertical face and being rotatable about a vertical axis to deflect material from the sides of the vessel into the path of the unloading machine,
 b. a carriage supporting said plow and providing horizontal movement of said plow transversely of the vessel,
 c. a vertically movable elevator carrying said carriage and providing adjustment for the vertical elevation of said plow in the vessel,
 d. a transverse bridge supporting and guiding said elevator, said bridge movable in a longitudinal direction of the vessel, and
 e. a fixed supporting structure spanning the vessel at a suitable elevation so the vessel may be moved thereunder during unloading, said structure supporting said elevator.

14. Plow apparatus to reduce the amount of manual cleanup for use with an unloading machine for reclaiming and elevating loose, bulk material from a marine vessel in a slip between a pier and a cell, said vessel being moved past the unloading machine in one or more longitudinal digging passes, the combination which comprises:
 a. a fixed supporting structure spanning the slip between the pier and the cell, said structure being at a suitable elevation so the vessel may be moved thereunder, said structure further being located adjacent to but ahead of the unloading machine,
 b. a transverse bridge mounted on said supporting structure for movement longitudinally of the vessel,
 c. an elevator movably guided by and supported within said transverse bridge, said elevator being movable in a vertical direction,
 d. a pair of transversely movable carriages mounted in said elevator, each carriage being independently adjustable in the transverse direction of the vessel, and
 e. a pair of plows, one mounted in each transversely movable carriage, each plow also being rotatable about a vertical axis, each plow having a vertical plow blade which, when positioned transversely of the vessel and rotated to an angle not parallel with the sides of the vessel, will push the material lying along the sides of the vessel toward the center of the vessel into the path of the unloading machine as the vessel is moved by said plows.

15. In a system for unloading, with a minimum amount of cleanup required, loose bulk material from a marine vessel adjacent a shore installation wherein the unloading system includes an unloading machine mounted on a fixed frame spanning the vessel, wherein a digging portion of the unloading machine is adjustable along an inclined path and wherein the vessel is moved past the unloading machine during unloading, apparatus which comprises in combination:
 a. a pair of plows preceding the unloading machine in engaging the material, said plows being rotatable about a vertical axis, being movable transversely of the vessel and being liftable to change the elevation of the plows, and
 b. an auxiliary skirt assembly located between said plows and the unloading machine said skirt assembly having two vertical plate members spaced apart a distance slightly greater than the reclaiming width of the unloading machine, whereby material moved into the path of the unloading machine by said plows is restrained from moving sideways by the skirt assembly, acting as false vessel sides, as the unloading machine digs into the material during reclaiming.

16. Plow apparatus to reduce the amount of cleanup required in an unloading system for reclaiming and elevating loose, bulk material from a marine vessel adjacent a pier wherein the vessel is slightly wider than the unloading machine, the vessel is moved past the unloading machine in one or more longitudinal passes, the vessel is further positioned so one longitudinal side is adjacent one transverse end of the unloading machine, the combination which comprises:
 a. a plow having a vertical blade member and a vertical shaft, said shaft being pivotally connected to said plow blade and projecting upwardly from said plow blade, said pivotal connection permitting said plow blade to conform to a listing of the vessel during unloading;
 b. a vertically movable elevator having a platform portion at its lower end, the upper end of said plow shaft being rotatably supported on said platform portion;
 c. a drive for rotating said plow shaft mounted on said platform portion having a driving connection to said plow shaft;

d. an upper and a lower guide bushing mounted on said platform portion for vertically guiding said plow shaft, said plow shaft having some vertical movement as a result of the tilting of the plow blade and listing of the vessel;
e. a carriage movable transversely of the vessel, said carriage guiding and supporting said elevator; and
f. a fixed supporting structure transversely spanning said vessel at a suitable elevation so the vessel may pass thereunder, said structure supporting said transversely movable carriage.

17. The plow apparatus of claim 16, wherein said plow is provided with at least one spring and said platform portion of said elevator is provided with a planar spring contact surface on the underside of said platform portion; said spring is mounted on the top horizontal edge of said plow blade and the upper-end of said spring bears against said contact surface, said spring providing vertical pressure on the pivotal plow blade to help said plow blade maintain contact with the bottom of the vessel as the plow blade tilts to conform to a listing of the vessel.

18. A method of unloading a marine vessel of loose, bulk material with a minimum of manual cleanup wherein an unloading machine and plow apparatus having at least one plow blade are used in combination and the inside of the vessel is slightly wider than the reclaiming width of the unloading machine, the unloading method comprising the steps of:
a. positioning the vessel with the stern end immediately under the unloading machine, and with one longitudinal side of the vessel adjacent one transverse end of the unloading machine;
b. lowering the unloading machine partially into the material in the vessel;
c. operating the unloading machine to remove material;
d. propelling the vessel longitudinally past the unloading machine in a first digging pass;
e. lowering the plow blade into the material in the end of the vessel with the plow blade perpendicular to the longitudinal side of the vessel;
f. rotating the plow blade to clean out the end corner of the vessel and to push the material toward the path of the unloading machine;
g. positioning the plow blade transversely of the vessel at the longitudinal side of the vessel opposite to the side at which the unloading machine is adjacent;
h. adjusting the plow blade to an angle with the longitudinal sides of the vessel to deflect material at the sides of the vessel into the path of the unloader;
i. returning the vessel to its original starting position with the stern end of the vessel under the unloading machine;
j. using the angularly positioned plow to deflect material at the side of the vessel into the path of the unloading machine as the vessel is propelled;
k. lowering the unloading machine deeper into the material and close to the bottom of the vessel;
l. rotating the plow blade parallel to the longitudinal side of the vessel and positioning the plow blade adjacent to the other transverse end of the unloading machine to act as a retaining skirt;
m. operating the unloading machine to remove material;
n. propelling the vessel longitudinally past the unloading machine in a final digging pass; and
o. raising the unloading machine and the plow blade above and clear of the empty vessel so it may be removed.

19. The unloading method of claim 18 wherein steps (a) to (d) inclusive may be repeated as necessary to provide more than one digging pass depending upon the size of the vessel and the capacity of the unloading machine.

20. The unloading method of claim 18 wherein steps (e) to (h) inclusive occur during a second digging pass, steps (e) to (h) thereafter following step (i).

21. A method of unloading a marine vessel of loose, bulk material with a minimum amount of manual cleanup wherein an unloading machine and plow apparatus having a pair of independently operable plow blades are used in combination, wherein the inside of the vessel is considerably wider than the reclaiming width of the unloading machine and wherein no provision is required for laterally positioning the unloading machine and the vessel, the unloading method comprising the steps of:
a. positioning the vessel with the stern end immediately under the unloading machine and with the transverse centerline of the vessel under the transverse centerline of the unloading machine;
b. lowering the unloading machine partially into the material in the vessel;
c. operating the unloading machine to remove material;
d. propelling the vessel longitudinally past the unloading machine in a first digging pass;
e. lowering the plow blades into the material in the bow end of the vessel with the plow blades perpendicular to the longitudinal sides of the vessel;
f. positioning and rotating the plow blades into each bow end corner to clean out the material therein and pushing the material toward the path of the unloading machine;
g. adjusting the plow blades at angle to the longitudinal sides of the vessel to deflect material at the sides into the path of the unloading machine;
h. returning the vessel to its original starting position with the stern end of the vessel under the unloading machine and using the angularly positioned plows to deflect material into the path of the unloading machine;
i. lowering the unloading machine deeper into the material and close to the bottom of the vessel;
j. rotating each plow blade parallel to the longitudinal sides of the vessel and positioning each plow adjacent to a transverse end of the unloading machine to act as retaining skirts;
k. operating the unloading machine to remove material;
l. propelling the vessel longitudinally past the unloading machine in a final digging pass; and
m. raising the unloading machine and the plow blades above and clear of the empty vessel so it may be removed.

* * * * *

UNITED STATES PATENT OFFICE
CERTIFICATE OF CORRECTION

PATENT NO. : 3,770,145
DATED : November 6, 1973
INVENTOR(S) : MORRIS B. UHRICH

It is certified that error appears in the above-identified patent and that said Letters Patent are hereby corrected as shown below:

Column 4, line 43, change "frmae" to --frame--.

Column 6, line 24, change "th" to --the--.

Column 7, line 43, change "plot" to --plow--.

Column 8, line 68, after 169 add --(Fig. 20)--.

Column 9, line 1, after 169 delete "(Fig. 20)".

Column 9, line 47, change "19" to --179--.

Signed and sealed this 17th day of June 1975.

(SEAL)
Attest:

RUTH C. MASON
Attesting Officer

C. MARSHALL DANN
Commissioner of Patents
and Trademarks